US006283890B1

(12) United States Patent
Schleuder et al.

(10) Patent No.: US 6,283,890 B1
(45) Date of Patent: Sep. 4, 2001

(54) MODULAR HOUSING FOR VEHICULAR POWER TRANSFER DEVICES

(75) Inventors: Carl D. Schleuder, Novi; David E. Young, Royal Oak, both of MI (US); Richard Mizon, Fayetteville, NY (US)

(73) Assignee: New Venture Gear, Inc., Troy, MI (US)

( * ) Notice: Subject to any disclaimer, the term of this patent is extended or adjusted under 35 U.S.C. 154(b) by 0 days.

(21) Appl. No.: 09/543,516

(22) Filed: Apr. 6, 2000

Related U.S. Application Data (63) Continuation-in-part of application No. 09/220,485, filed on Dec. 23, 1998, now Pat. No. 6,053,072.
(60) Provisional application No. 60/071,166, filed on Jan. 12, 1998.

(51) Int. Cl.[7] ..................................................... F16H 57/02
(52) U.S. Cl. .................. 475/343; 74/665 GA; 74/606 R
(58) Field of Search .......................... 74/606 R, 665 GA; 475/343

(56) References Cited

U.S. PATENT DOCUMENTS

| | | |
|---|---|---|
| 4,434,606 | 3/1984 | Rhodes et al. . |
| 4,782,719 | 11/1988 | Yarnell . |
| 5,146,748 | 9/1992 | Okada . |
| 5,156,576 | 10/1992 | Johnson . |
| 5,207,121 | 5/1993 | Bien . |
| 5,704,863 | 1/1998 | Zalewski et al. . |
| 5,836,219 | 11/1998 | Klingler et al. . |
| 5,960,671 | * 10/1999 | Nguyen .............................. 74/606 R |
| 6,053,072 | * 4/2000 | Schleuder .......................... 74/606 R |

FOREIGN PATENT DOCUMENTS

| | | |
|---|---|---|
| 3815511 | 11/1989 | (DE) . |
| 0543731 | 5/1993 | (EP) . |

* cited by examiner

Primary Examiner—Dirk Wright
(74) Attorney, Agent, or Firm—Harness, Dickey & Pierce, P.L.C.

(57) ABSTRACT

A power transfer device for a motor vehicle having a modular housing assembly which supports a geartrain. A first embodiment of the modular housing assembly includes a case having unitary sidewall with terminal edges defining two opposed openings. The sidewall also defines an interior chamber and the openings are enclosed by a pair of cover plates. Pillow blocks are used to support the drive components of the geartrain within the chamber and are secured to shelves which extend from the sidewall. Loads created during operation are transmitted from the geartrain to the sidewall. The cover plates are secured to the terminal edges of the sidewall using a plurality of U-shaped spring clamps. A second embodiment of the modular housing assembly includes a box-like case having one open side. A cover plate is used to enclose the geartrain and lubrication fluid within the interior volume of the box-like case. A continuous support shelf is formed from the base of the box-like case and allows loads to be transmitted directly to the box-like case. A third embodiment of the modular housing assembly includes a box-like case having one open side, a cover plate used to enclose the geartrain and a continuous support shelf. Rotary and non-rotary components of the geartrain are entirely contained within the box-like case. Pillow blocks are used to support the drive components of the geartrain.

21 Claims, 11 Drawing Sheets

MODULAR HOUSING FOR VEHICULAR POWER TRANSFER DEVICES

CROSS REFERENCE TO RELATED APPLICATIONS

This application is a continuation-in-part of U.S. application Ser. No. 09/220,485 filed Dec. 23, 1998 now U.S. Pat. No. 6,053,072 which is based on Provisional application Ser. No. 60/071,166 filed Jan. 12, 1998.

FIELD OF THE INVENTION

The present invention relates to a modular housing and assembly methods for power transfer devices of the type used in motor vehicles.

BACKGROUND OF THE INVENTION

As is widely known, automobile manufacturers desire the flexibility to offer a variety of drivetrain packages with different power transmission characteristics (i.e., number of gear ratios, torque capacity, 2WD/4WD, etc.) for each vehicle. This flexibility is limited, however, by the significant cost and leadtime required to design and validate a series of different power transfer devices (i.e., transfer cases, transmissions, transaxles, axle assemblies, etc.). This dilemma is further aggravated by the competitive need to develop lighter weight and higher efficiency power transfer devices at a reduced cost.

A significant amount of the weight and manufacturing cost associated with traditional power transfer devices is derived from the housing. Typically, the housing is assembled from two or more bell-shaped castings that are interconnected to form an enclosed chamber within which a geartrain is supported. Additionally, the various rotary components (i.e., shafts, gears, carriers, etc.) of the geartrain extend through and/or are rotatably supported by one or more of the castings. As such, each casting must be constructed from a material having sufficient strength and thickness to absorb the loads created during power transmission while providing acceptable noise isolation and heat transfer characteristics. Consequently, most housings are designed for use with a single power transfer device. Hence, increased costs are incurred when a variety of drivetrain packages are offered to the consumer.

Another disadvantage associated with conventional housings is the secondary machining required to permit the castings and the drive components of the geartrain to be properly aligned during assembly. For example, since threaded fasteners are used to rigidly connect the castings, the flatness of the mounting face on the rim of each casting and the location of threaded holes therein are critical to proper alignment and sealing of the power transfer device.

SUMMARY OF THE INVENTION

It is therefore desirable to provide a power transfer device with a modular housing assembly which, when compared to traditional housings, increases assembly precision while concomitantly decreasing cost and reducing sound transmission.

According to a first embodiment of the present invention, a power transfer device is provided with a modular housing assembly having a center case and a pair of cover plates which are secured to the center case to define an enclosed chamber. The center case includes a continuous sidewall which is open on two opposing sides to define a pair of openings. The cover plates are mounted to the center case and enclose its openings. Mounting shelves extend inwardly from the sidewall of the center case and are adapted to align and support mounting devices for carrying both the rotary and non-rotary components of a geartrain. The mounting shelves are designed to transfer the loads transmitted by the components of the geartrain to the sidewall of the center case. All of the mounting shelves may have a mounting surface located in a common plane. Such an arrangement simplifies the machining, inspection, and assembly time required to build a power transfer device. Moreover, the location of the mounting shelves may be commonized to permit different power transfer devices to be assembled using a single center case. As such, the modularity of the center case and the cover plates, in combination with the design flexibility afforded by the mounting shelves, will provide simplified assembly operations with higher precision alignment of the geartrain components.

According to another embodiment of the present invention, a power transfer device is provided with a modular housing assembly comprised of a box-like center case and a single cover plate. The center case includes a continuous sidewall segment and an integral base segment which together form an interior chamber which is enclosed by the cover plate.

In another embodiment of the present invention, a power transfer device is provided with a modular housing assembly having a center case and a cover plate. The center case includes a continuous sidewall segment and an integral base segment which together form an interior chamber which is enclosed by the cover plate. Mounting pads extend inwardly from the integral base and sidewall segments of the center case, and align and support mounting devices for carrying both the rotary and non-rotary components of a geartrain. The rotary and non-rotary components of the geartrain, along with an electric gearmotor, are entirely contained within the interior chamber of the center case. More specifically, the power transfer device in this instance includes a transfer case equipped with a torque transfer arrangement that is operable for automatically controlling the drive torque delivered to the front and rear drivelines of the vehicle to establish two-wheel, four-wheel high, neutral and four-wheel low drive modes.

In association with all of the embodiments, the cover plate includes a peripheral flange that is adapted to be mounted on a peripheral rim of the center case adjacent its opening. The cover plate contains an O-ring type seal adhered to its peripheral rim. Thereafter, the cover plate is secured to the center case by a set of spring clamps. The spring clamps are spaced for achieving a relatively constant load between the mating cover plate seal and the center case rim, thereby achieving a fluid-tight seal. The cover plates are not required to perform the traditional functions of locating and supporting the geartrain components or gearmotor and, as such, do not function to absorb or carry any loads from the geartrain or gearmotor. Instead, each cover plate encloses the opening of the center case for sealing a supply of lubricating fluid within the modular housing assembly. Preferably, the cover plates are manufactured from a stiff, yet lightweight material which, for example, can be a molded composite or stamped steel component.

Employing the above embodiments of the present invention, a power transfer device having a lightweight, yet robust, modular housing assembly can be used in a variety of power transmission applications. Additionally, the present invention reduces the manufacturing time and cost by improving tolerance capabilities for aligning the drive components of the power transfer device.

Further areas of applicability of the present invention will become apparent from the detailed description provided hereinafter. It should be understood however that the detailed description and specific examples, while indicating preferred embodiments of the invention, are intended for purposes of illustration only, since various changes and modifications within the spirit and scope of the invention will become apparent to those skilled in the art from this detailed description.

BRIEF DESCRIPTION OF THE DRAWINGS

The present invention will become more fully understood from the detailed description and the accompanying drawings in which.

DETAILED DESCRIPTION OF THE PREFERRED EMBODIMENTS

Figure 1:
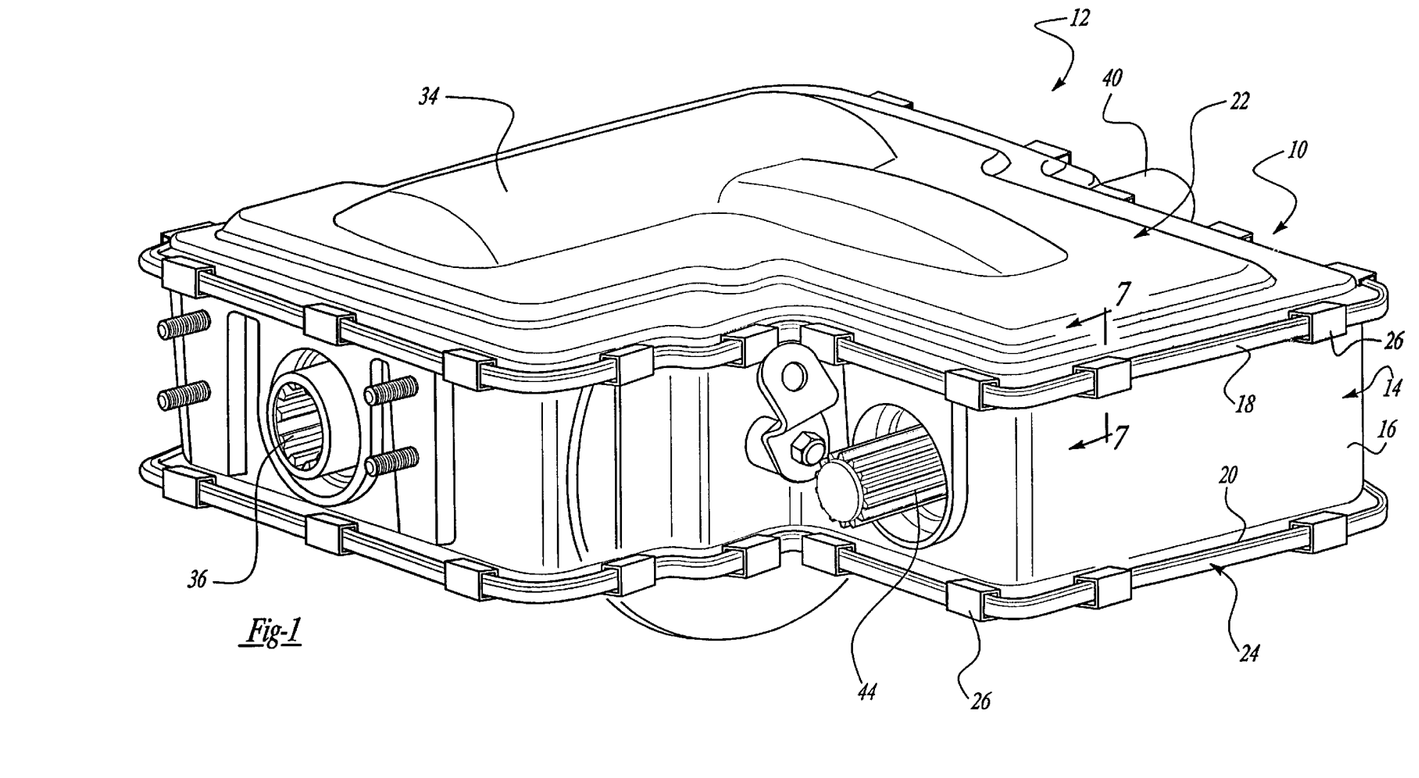
FIG. 1 is a perspective view of an exemplary power transfer device having a modular housing assembly according to a first embodiment of the present invention.

Referring initially to FIG. 1, a modular housing assembly 10 for a power transfer device of the type used in the drivetrain of a motor vehicle is shown. The power transfer device can be any component of the vehicle's drivetrain (i.e., RWD transmission, FWD transaxle, 4WD transfer case, differential, drive axle, etc.) in which housing assembly 10 is used for supporting a geartrain in a sump of lubricating fluid. In the exemplary embodiment shown, the power transfer device is a four-wheel drive transfer case 12.

Housing assembly 10 includes a center case 14 having a continuous sidewall 16 with opposite terminal edges defining a pair of openings. Center case 14 further includes a first or upper peripheral rim 18 and a second or lower peripheral rim 20 which extend outwardly from the terminal edges of sidewall 16. In this manner, center case 14 defines an interior open volume that is open on two opposing sides. While not limited thereto, center case 14 is preferably cast from aluminum or magnesium. Housing assembly 10 further includes a first or upper cover plate 22 and a second or lower cover plate 24 which are respectively secured to upper rim 18 and lower rim 20 of center case 14 by a plurality of fasteners, such as spring clamps 26, to define a sealed interior chamber 28.

Figure 2:
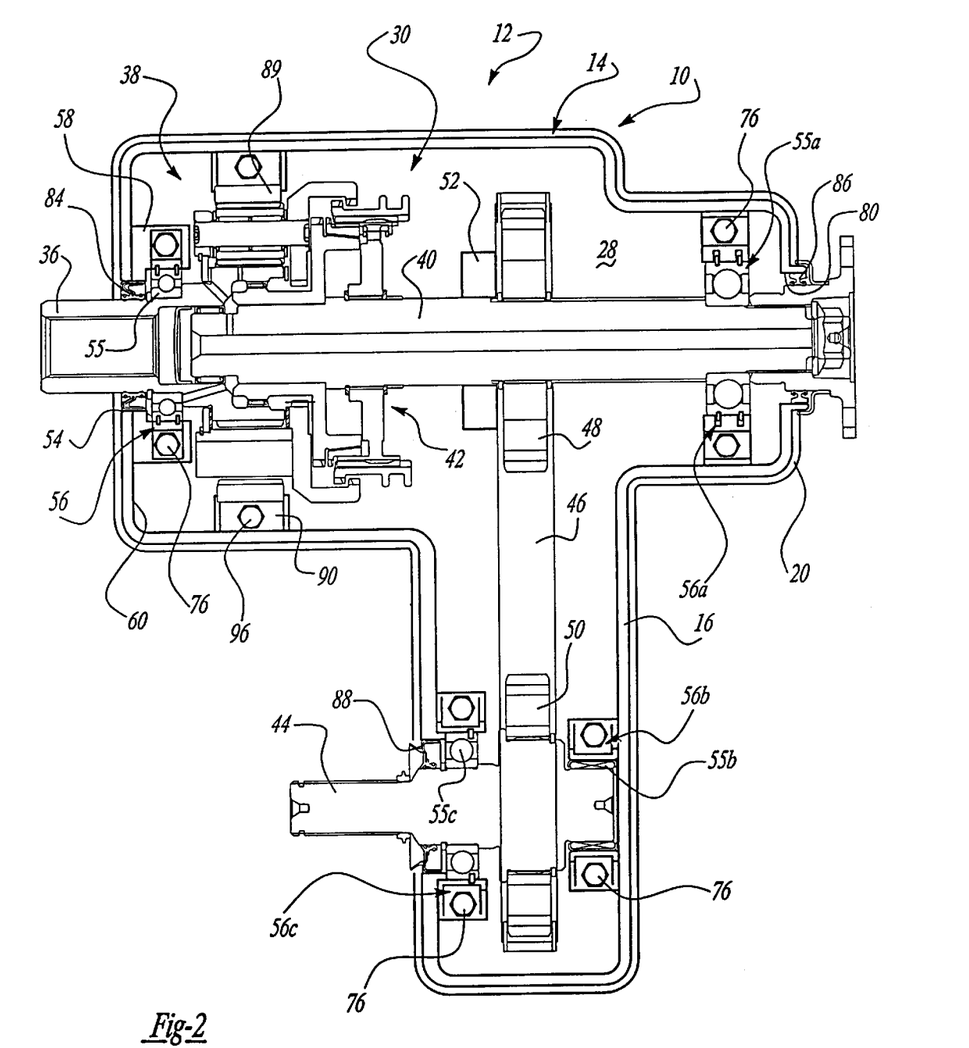
FIG. 2 is a longitudinal sectional view of the power transfer device showing a conventional geartrain mounted in the housing assembly.

Referring to FIG. 2, housing assembly 10 is shown with cover plates 22 and 24 removed to reveal an exemplary power transmission geartrain 30 supported from center case 14. In general, exemplary power transmission geartrain 30 is similar to that shown in the four-wheel drive transfer case disclosed in commonly-owned U.S. Pat. No. 5,346,442. In this regard, geartrain 30 includes an input shaft 36, a two-speed planetary gearset 38, a rear output shaft 40, a range clutch 42, a front output shaft 44, a drive chain 46 connecting a drive sprocket 48 rotatably supported on rear output shaft 40 to a driven sprocket 50 fixed to front output shaft 44, and a mode clutch shown by block 52. However, the specific componentry of geartrain 30 is not critical to the present invention since geartrain 30 represents any combination of components which are mounted and sealed in interior chamber 28 of housing assembly 10 when upper cover plate 22 and lower cover plate 24 are secured to center case 14.

Cover plates 22 and 24 are adapted to control noise, vibration, and harshness and are preferably manufactured as steel stampings or molded polymeric composites, or, in the alternative, may be fabricated from any other stiff, lightweight, corrosion resistant material. More preferably, cover plates 22 and 24 are net formed so as to require minimal, if any, secondary machining operations. Cover plates 22 and 24 include a plurality of variably sized transition segments, an example of which is identified by reference numeral 34, which provide clearances for the components of geartrain 30 and/or improve noise isolation and rigidity. With the above disclosure in mind, it should be understood that upper cover plate 22 and lower cover plate 24 do not locate and/or carry loads developed by geartrain 30. Rather, upper cover plate 22 and lower cover plate 24 simply enclose and seal geartrain 30 and a supply of lubricating fluid within interior chamber 28 of center case 14. This arrangement allows the use of cover plates 22 and 24 to significantly reduce the overall weight and cost of housing assembly 10.

In accordance with the present invention, means are provided for supporting the various components of geartrain 30 from sidewall 16 of center case 14. In particular, input shaft 36 is shown to extend through an aperture 54 in sidewall 16 and is rotatably supported by a bearing assembly 55. Bearing assembly 55 is mounted in a pillow block 56 which, in turn, is rigidly secured to a platform-type shelf member 58 extending into chamber 28 from an interior wall surface 60 of sidewall 16. As seen from FIG. 4, shelf 58 is cantilevered from sidewall 16 and is integrally formed therewith or, in the alternative, may be welded thereto. To provide additional rigidity, if required, optional reinforcement webs 62 may extend between an underside surface 63 of shelf 58 and inner surface 60 of sidewall 16.

Figures 3, 4:
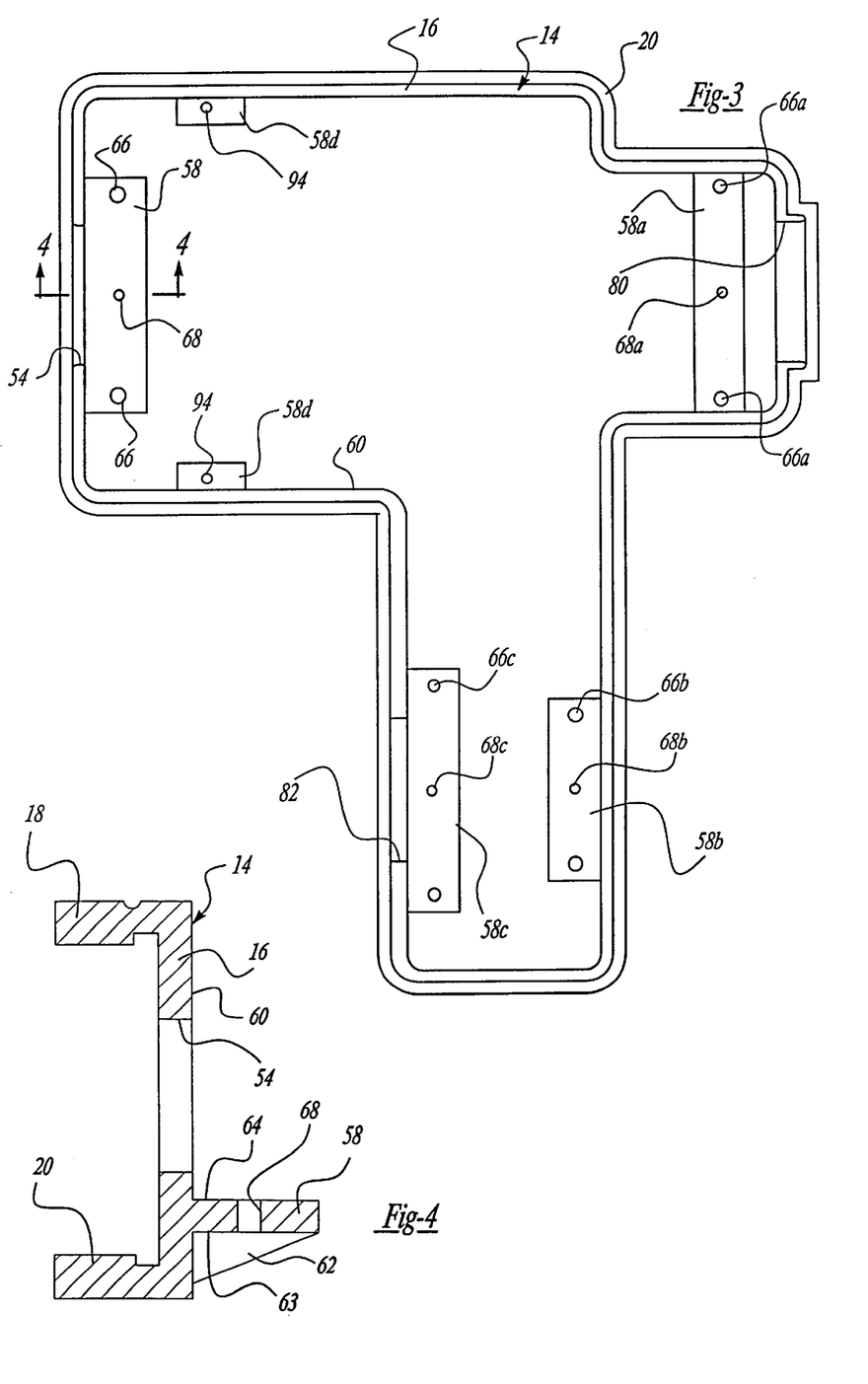
FIG. 3 is a side view of the center case associated with the housing assembly.
FIG. 4 is a sectional view taken generally along line 4—4 of FIG. 3.

An upper surface 64 of shelf 58 is planar and, as best seen from FIG. 3, is formed to include a pair of threaded apertures, 66 and an alignment bore 68. From FIG. 5, pillow block 56 is shown to include a mounting pad 70 with a planar underside surface 72 that is adapted to rest upon upper surface 64 of shelf 58. Mounting pad 70 has a pair of mounting apertures 74 which are alignable with apertures 66 in shelf 58 for receipt of threaded fasteners 76 therein. In this manner, pillow block 56 is rigidly secured to shelf 58, thereby rotatably supporting input shaft 36 from center case 14. A dowel pin (not shown) extending from underside surface 72 of pillow block mounting pad 70 is adapted to be received in alignment bore 68 in shelf 58 to accurately align pillow block 56 with respect to shelf 58. As an alternative, a keyway can be formed in shelf 58 for receipt of a key extending from pillow block mounting pad 70.

In line with the above disclosure, center case 14 is shown to include additional shelves that are generally similar to shelf 58 and which permit precision alignment and mounting of other mounting devices such as, for example, additional pillow blocks, for supporting the remaining components of geartrain 30. For example, shelf 58a is shown in FIG. 3 to extend across center case 14 for permitting a pillow block 56a (FIG. 2) to be located and mounted thereto. Alternatively, shelf 58a could extend from sidewall 16 of center case 14 in a manner similar to shelf 58. With either arrangement, shelf 58a includes threaded apertures 66a and dowel bore 68a for mounting a pillow block 56a thereon. A bearing assembly 55a is mounted in pillow block 56a for rotatably supporting an end portion of rear output shaft 40 which extends through an aperture 80 in sidewall 16 of center case 14. As a further alternative, shelf 58a could be bifurcated to define a pair of shelves that extend inwardly from opposing sides of center case 14.

Center case 14 also includes shelves 58b and 58c that are provided to respectively align and secure pillow blocks 56b and 56c to center case 14. Bearing assembles 55b and 55c mounted in pillow blocks 56b and 56c, respectively, rotatably support front output shaft 44 which extends through an aperture 82 in sidewall 16 of center case 14. Again, corresponding threaded apertures 66b, 66c and alignment apertures 68b, 68c are provided. As is conventional, rotary seals 84, 86 and 88 are provided to prevent lubricating fluid within chamber 28 from escaping through apertures 54, 80 and 82, respectively. It will be understood that shelves 58a, 58b and 58c are similar in structure and function to that previously detailed in the description provided for shelf 58, with the suffixes generally indicating such commonality. Moreover, the upper mounting surface 64 for each shelf is preferably arranged in a common plane which, when used in conjunction with pillow blocks 56 having commonized mounting pad dimensions, will minimize and simplify machining and assembly operations. In addition to simplified assembly, the shelves are designed to transfer loading from geartrain 30 to center case 14.

Figures 5, 6, 7:
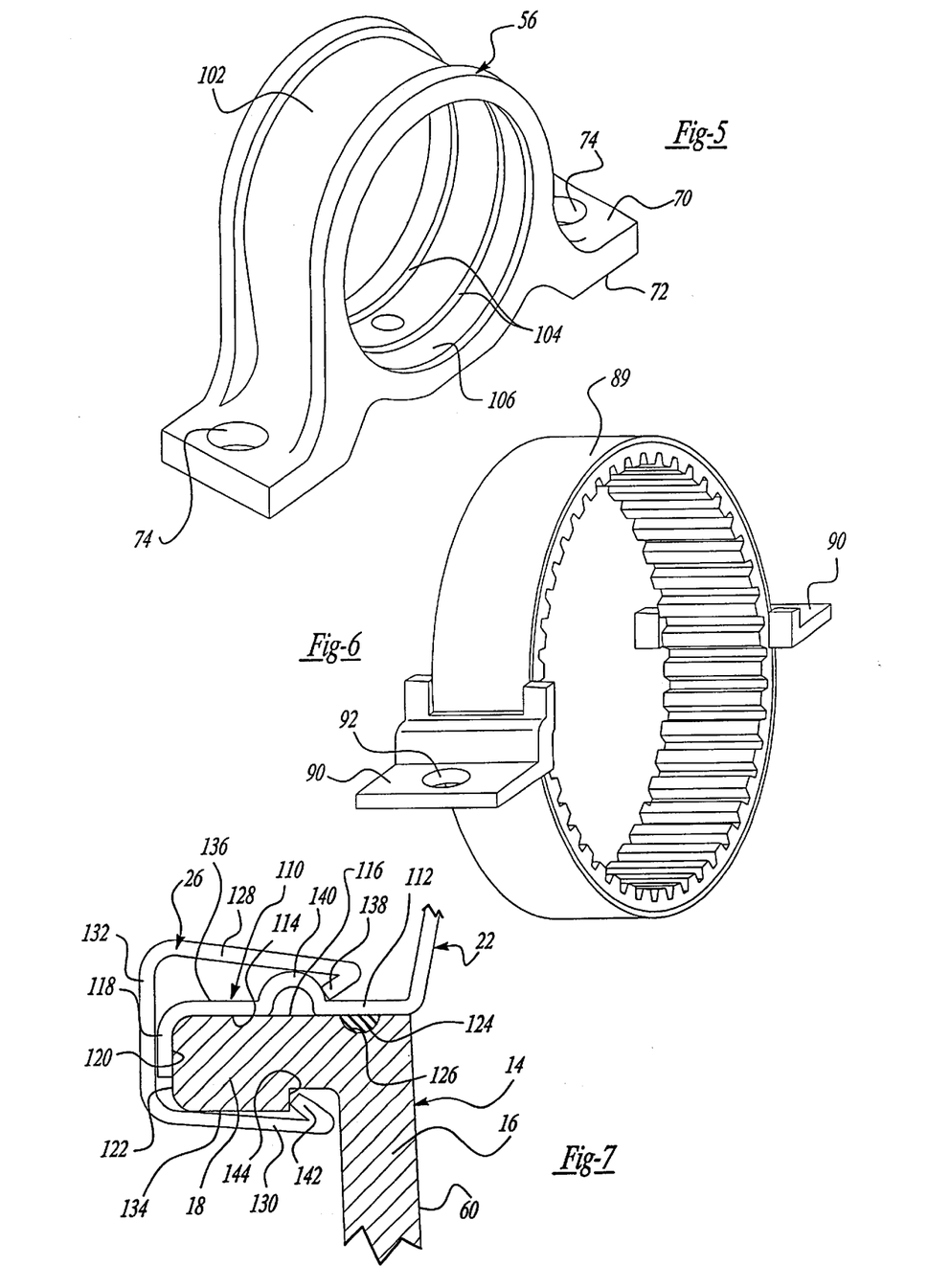
FIG. 5 is a perspective view of a mounting device used for supporting a rotary component of the geartrain and which is adapted to be mounted to the center case.
FIG. 6 is a perspective view of a mounting device used for supporting a non-rotary component of the geartrain and which is adapted to be mounted to the center case.
FIG. 7 is a partial sectional view taken generally along line 7—7 of FIG. 1 showing the spring clamp attachment between the center case and the cover plates.

Referring to FIGS. 2, 3 and 6, a direct mounting device is shown for securing a non-rotating component, such as an annular ring gear 89 of planetary gearset 38, to sidewall 16 of center case 14. In particular, a pair of mounting brackets 90 are non-rotatably fixed (i.e., keyed) to the opposite peripheral edges of ring gear 89 and each has a mounting aperture 92 formed therein. A pair of opposing shelves 58d extend from sidewall 16 and have a threaded aperture 94 formed therein that are alignable with mounting apertures 92 in mounting brackets 90. Once apertures 92 and 94 are aligned, threaded fasteners 96 are driven therethrough, thereby fixedly securing ring gear 89 to center case 14.

As seen in FIG. 5, in addition to mounting pad 70, pillow block 56 includes a hollow cylindrical drum 102 with a pair of grooves 104 formed in its inner surface 106 for receiving snap rings so as to axially retain bearing assembly 55 therein. The use of pillow blocks as described above, allows for simplified fabrication and machining of center case 14 as well as simplified assembly and inspection of geartrain 30 therein. The use of snap rings to retain the bearing assemblies in the pillow blocks improves the assembly process by allowing an entire geartrain 30, including the shafts, pillow blocks, bearings and drive components to be pre-assembled and placed into center case 14 at one time. Furthermore, employing this technique allows automated assembly of the power transfer devices 12 so as to increase productivity and decrease costs.

Referring now to FIG. 7, an arrangement for sealing cover plates 22 and 24 to center case 14 using a set of spring clamps 26 is described. In accordance with the present embodiment, the method used for securing upper cover plate 22 to upper rim 18 is identical to that used to secure lower cover plate 24 to lower rim 20. Accordingly, for clarity of disclosure, only the method and arrangement for sealing upper cover plate 22 to upper rim 18 will be discussed. As seen, cover plate 22 has a peripheral edge flange 110 which, when installed on center case 14, is adapted to mate with and overhang rim 18. In particular, flange 110 includes a first segment 112 having an underside surface 114 that is adapted to matingly engage a top surface 116 of rim 18. Edge flange 110 also includes a second segment 118 which is angled relative to first segment 112 and which is adapted to overhang rim 18. Second segment 118 includes an underside surface 120 that is adapted to engage an edge surface 122 of rim 18. A seal element 124 is shown retained in a groove 126 formed in top surface 116 of rim 18 for establishing a fluid-tight seal between cover plate 22 and center case rim 18 when spring clamps 26 are installed.

Each spring clamp 26 is U-shaped and includes a pair of legs 128 and 130 extending transversely from a base segment 132. Spring clamps 26 are installed when edge flange 110 of cover plate 22 is mounted onto rim 18 of center case 14. In particular, spring clamps 26 are installed such that leg 130 is biased into engagement with an underside surface 134 of rim 18 while leg 128 is biased into engagement with an outer surface 136 of first segment 112 of flange 110. Leg 128 of spring clamp 26 has a bent-over lip 138 that is adapted to forcibly engage a continuous projection 140 formed in first segment 112 of flange 110. Likewise, leg 130 has a bent-over lip 142 that is adapted to engage a recessed shoulder surface 144 formed by a groove in underside 134 of rim 18. As spring clamps 26 compress cover plate 22 to rim 18, seal element 124 deforms to create a dedicated sealing joint, thereby enclosing the lubricating fluid within interior chamber 28 of modular housing assembly 10. This dedicated sealing joint is an improvement over the traditional method in that it is only exposed to the loads created by spring clamps 26, rather than the loads created by the drive components. Optionally, a second seal element may be installed within projection 140 to arrange the sealing characteristics.

Figures 8, 10:
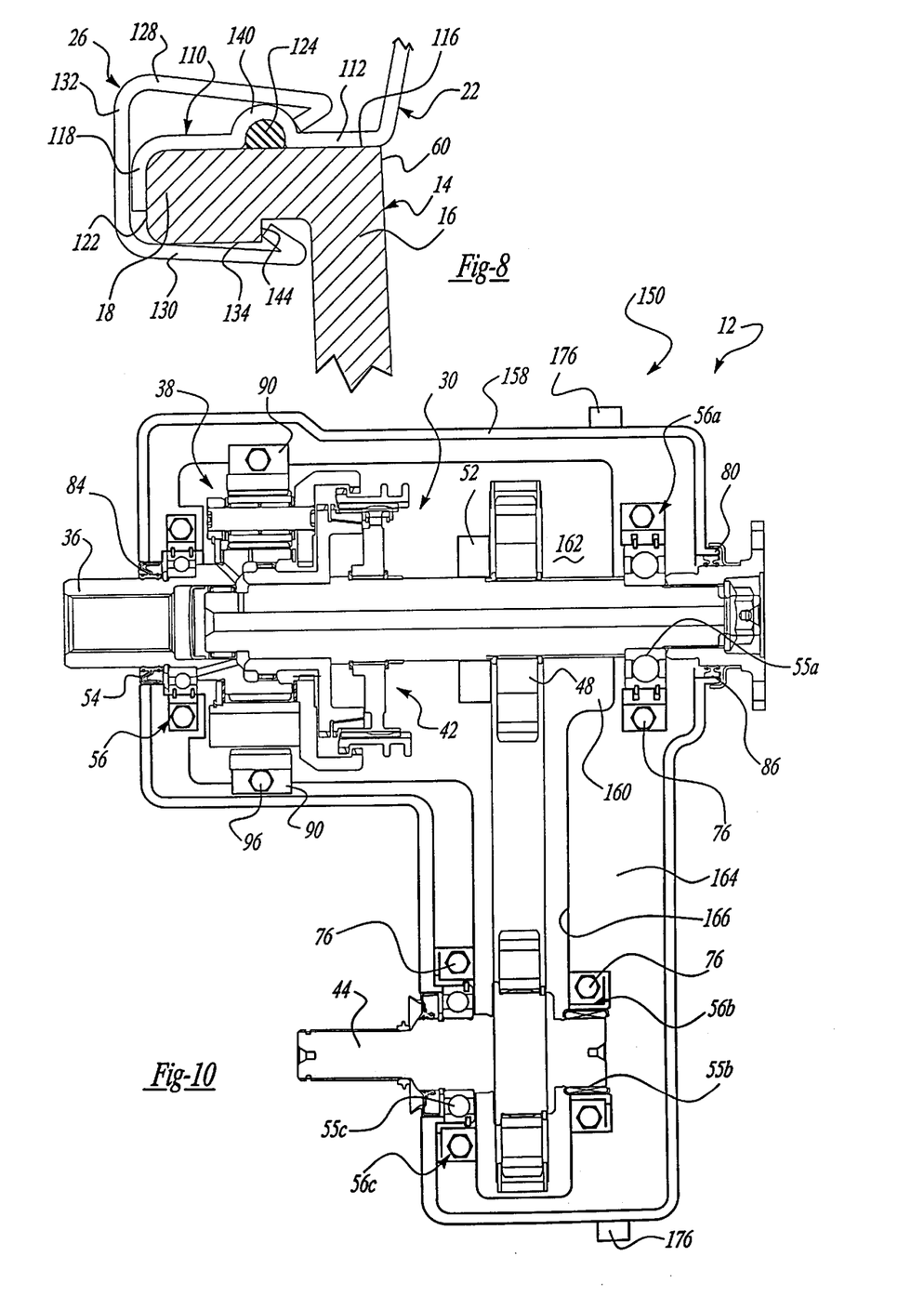
FIG. 8 is a partial sectional view showing an alternative spring clamp attachment arrangement.
FIG. 10 is a sectional view of FIG. 9.

As an alternative to the spring clamp arrangement shown in FIG. 7, FIG. 8 illustrating a modified arrangement wherein groove 126 in rim 18 is eliminated and seal element 124 is retained in the groove defined by projection 140 in first segment 112 of flange 110. While spring clamps 26 are shown to be U-shaped, it should be appreciated that spring clamps 26 may be adapted to any shape that can compressingly secure cover plate 22 to flange 18. The U-shaped spring clamps 26 are spaced around the connection of cover plate 22 and flange 18 to achieve a relatively constant sealing load therebetween. Preferably, spring clamps 26 are made of a material capable of resisting corrosion and thermocycling. It is anticipated that spring clamps 26 will be installed/removed using an assembly tool.

According to an alternative embodiment of the present invention shown in FIGS. 9 through 12, the power transfer device is shown as a transfer case 12' having a modular housing assembly 150 which supports geartrain 30. As seen, common reference numerals are used to identify components similar to those previously described in association with housing assembly 10. Modular housing assembly 150 includes a box-like case 152 and a cover plate 154 secured to case 152 using a plurality of spring clamps 26. Box-like case 152 includes a continuous sidewall portion 158 having a continuous peripheral rim 159, and an integral base portion 160 which define an interior chamber 162 within which geartrain 30 is mounted. Geartrain 30 and the lubricating fluid are enclosed and sealed in interior chamber 162 by cover plate 154. Similar to cover plates 22 and 24 of the first embodiment, cover plate 154 is mounted and sealed relative to rim 159 for controlling noise, vibration, and harshness without the loads of geartrain 30 being transferred thereto. Using spring clamps 26, a system similar to that disclosed in FIGS. 7 and 8 is used to seal and secure cover plate 154 to rim 159 of case 152.

Figure 9:
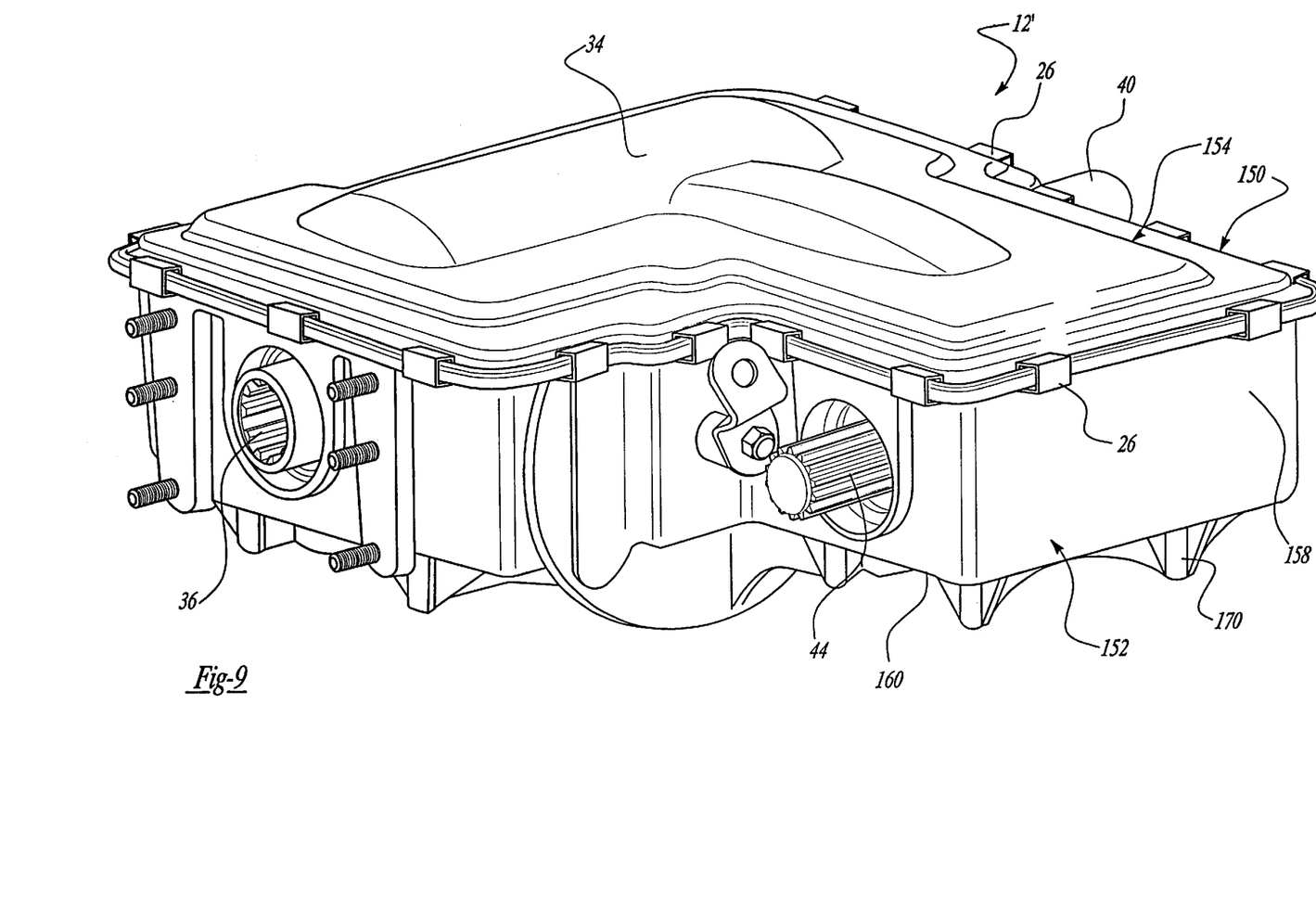
FIG. 9 is a perspective view of an exemplary power transfer device having a modular housing assembly according to an alternative embodiment of the present invention.
Figure 11:
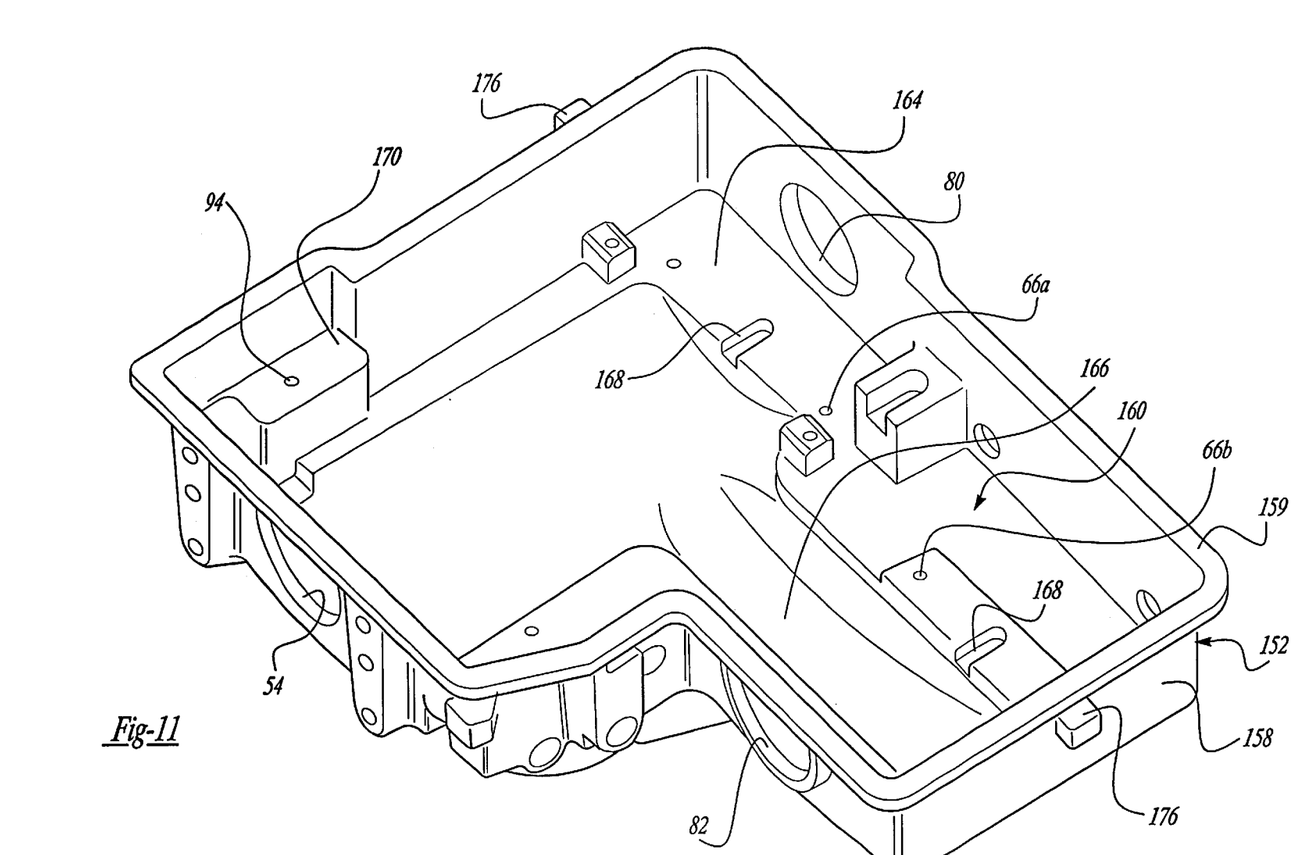
FIGS. 11 and 12 are pictorial views of the box-like case associated with the modular housing assembly of FIG. 9.
Figure 12:
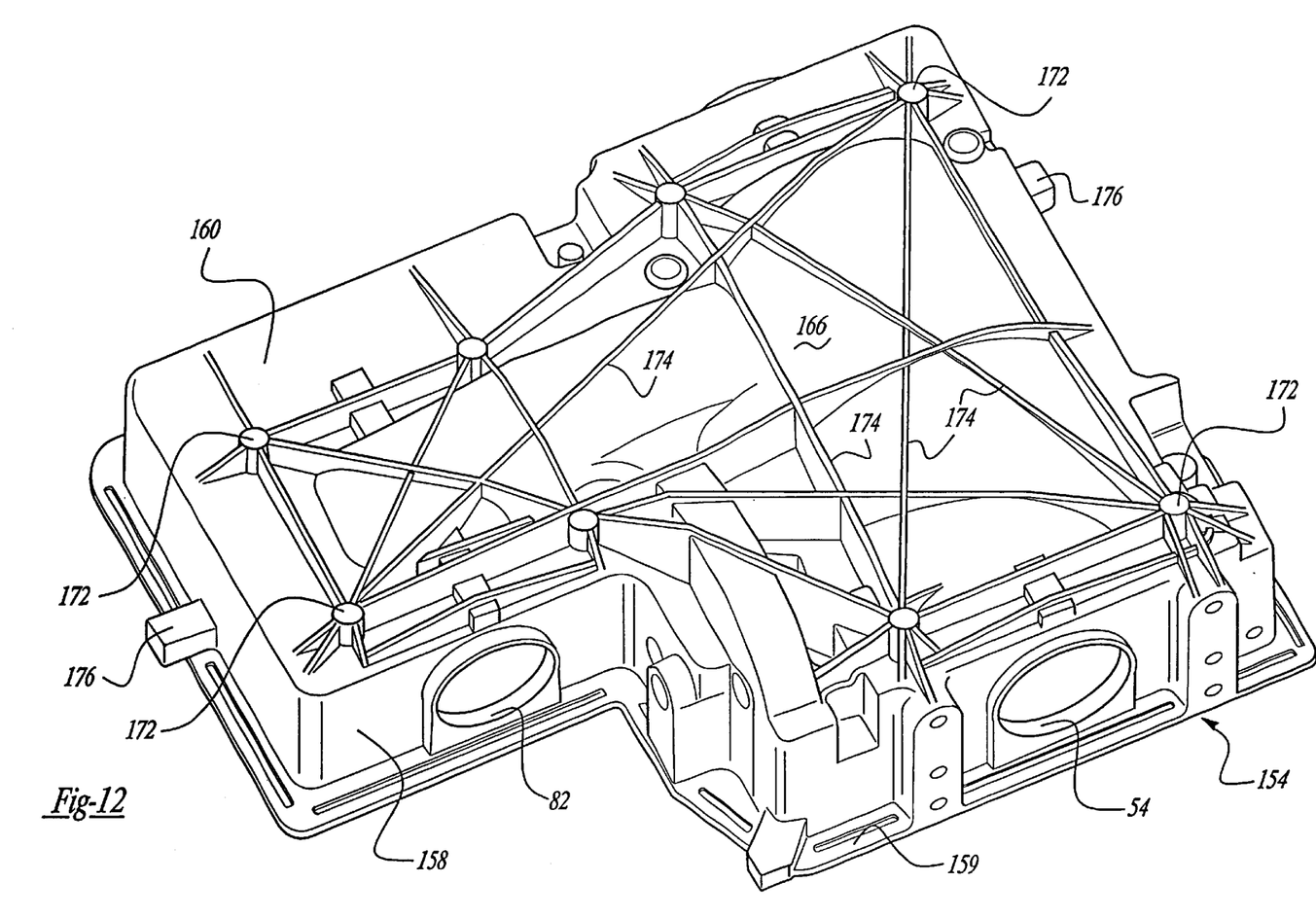

With particular reference to FIGS. 9 and 10, base portion 160 of case 152 is shown to include a continuous shelf segment 164 formed adjacent to sidewall portion 158, and a central recessed segment 166. Preferably, shelf segment 164 is formed in a plane which is orthogonal to sidewall portion 158. Recessed segment 166 is sized to provide the required clearances for all rotary components of geartrain 30, while shelf segment 164 is adapted to permit pillow blocks to be aligned and mounted thereto. For example, pillow blocks 56, 56a, 56b and 56c are adapted to be fixed to shelf segment 164 via threaded fasteners 76 driven through aligned sets of mounting apertures and threaded bores. As seen, keyways 168 provide alignment for the pillow blocks. Likewise, a trunion 170 is provided for mounting ring gear 89 to case 152 via mounting bracket 90. Trunion 170 is representative of others that are provided for mounting components at a level above shelf segment 164.

To provide sufficient structure to accept fasteners 76, each threaded bore formed in shelf segment 164 is reinforced in a boss 172 which extends outwardly from base portion 160. As best seen from FIG. 12, a series of reenforcement rails 174 criss-cross the outer surface of recessed segment 166 to provide additional rigidity. One or more sets of machining lugs 176 extend from case 152 and are used for accurately fixturing case 152 during machining operations.

Figure 13:
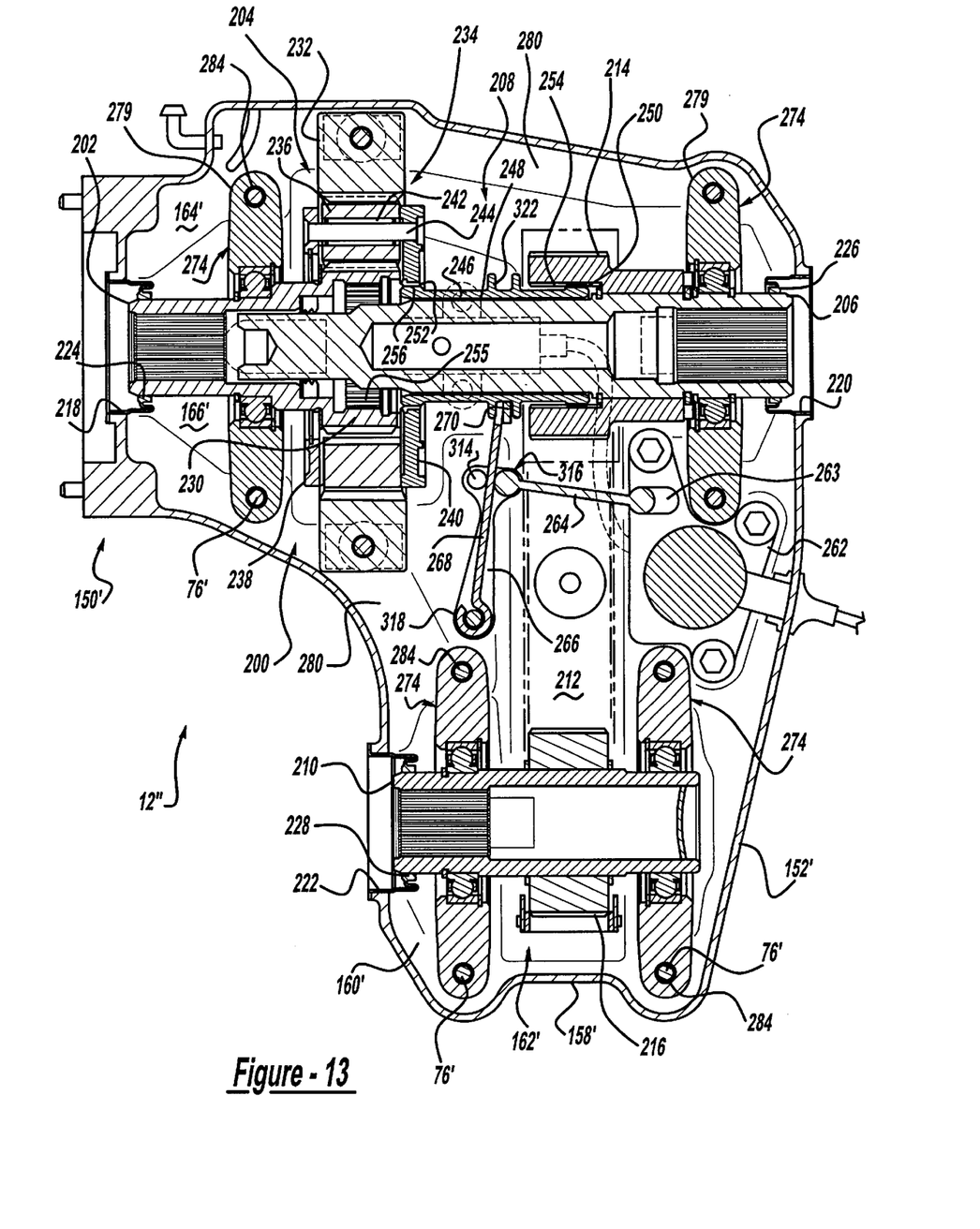
FIG. 13 is a longitudinal sectional view of a transfer case and gearmotor mounted in a modular housing assembly according to an alternative embodiment of the present invention.
Figure 14:
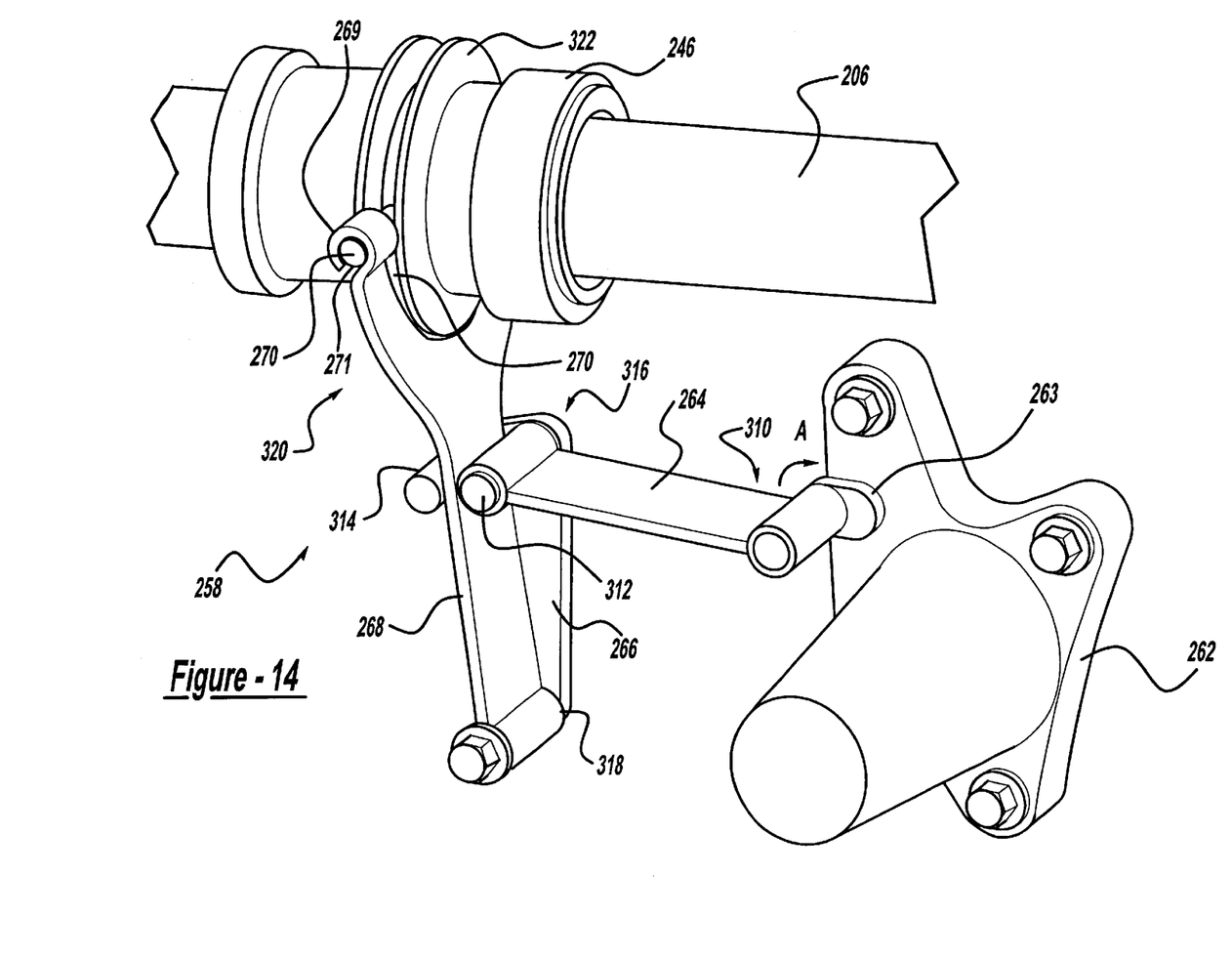
FIG. 14 is an enlarged perspective view of a range shift mechanism associated with the modular housing assembly of FIG. 13.
Figure 15:
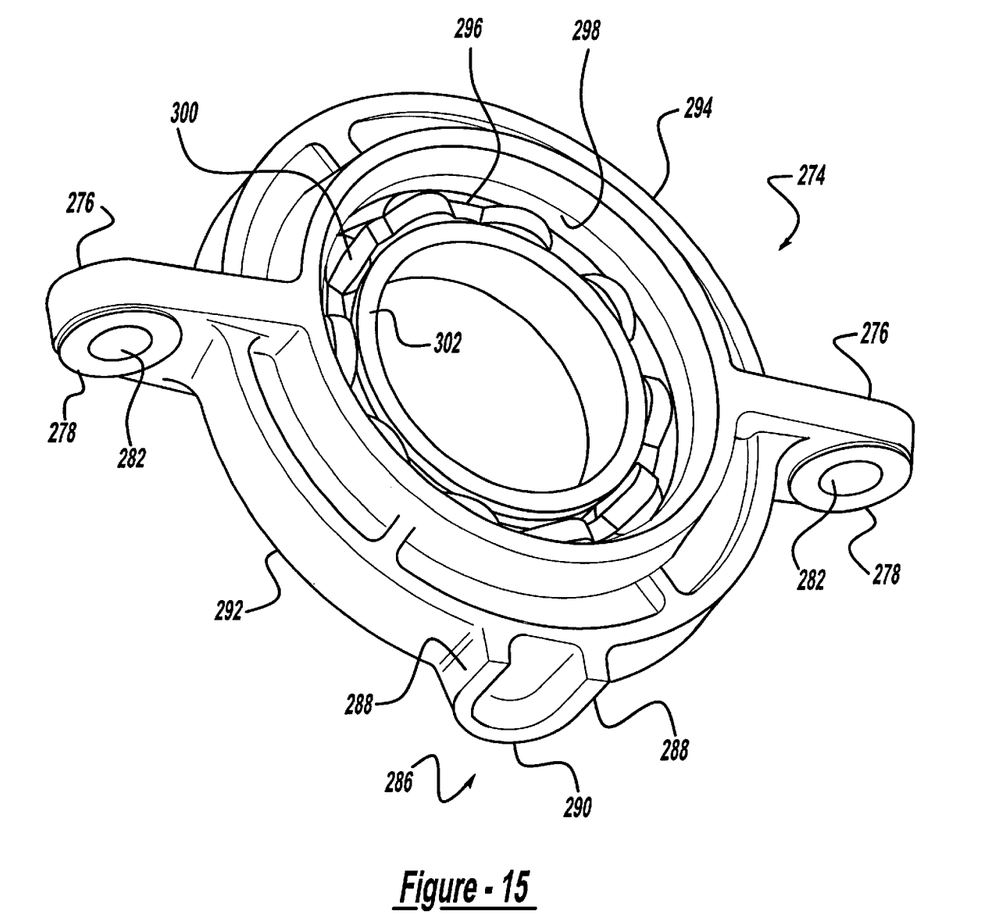
FIG. 15 is a perspective view of an alternative mounting device used for supporting a rotary component of the geartrain and which is adapted to be mounted to the center case.

According to another alternative embodiment of the present invention shown in FIGS. 13 through 15, the power transfer device is shown as a transfer case 12" having a modular housing assembly 150' which supports geartrain 200 and gearmotor 262. As seen, common reference numerals are used to identify components similar to those previously described in association with housing assembly 10 and 150. Modular housing assembly 150' includes a box-like case 152'. Box-like case 152' includes a continuous sidewall portion 158' and an integral base portion 160' which define an interior chamber 162' within which geartrain 200 is mounted. Base portion 160' of box-like case 152' is shown to include a continuous shelf segment 164' formed adjacent to sidewall portion 158', and a central recessed segment 166'. Recessed segment 166' is sized to provide the required clearances for all rotary components of geartrain 200, while shelf segment 164' is adapted to permit pillow blocks to be aligned and mounted thereto. Shelf segment 164' also includes mounting pads which when used in conjunction with pillow blocks having commonized mounting pad dimensions, will minimize and simplify machining and assembly operations. In addition to simplified assembly, shelf segment 164' is designed to transfer loading from geartrain 200 and gearmotor 262 to box-like case 152'. Geartrain 200, gearmotor 262 and the lubricating fluid are enclosed and sealed in interior chamber 162' by a cover plate. Similar to cover plates 22, 24 and 154, the cover plate in this alternative embodiment controls noise, vibration, and harshness without the loads of geartrain 200 and gearmotor 262 being transferred thereto.

With particular reference to FIG. 13, geartrain 200 includes an input shaft 202 rotatably driven by an engine, a planetary gear reduction unit 204, a rear output shaft 206, a range shift mechanism 208 for selectively coupling rear output shaft 206 to either input shaft 202 or planetary gear reduction unit 204, a front output shaft 210, and a drive chain 212 connecting a drive sprocket 214 rotatably supported on rear output shaft 206 to a driven sprocket 216 fixed to front output shaft 210. Input shaft 202, rear output shaft 206, and front output shaft 210 are entirely contained within sidewall portion 158' of box-like case 152'. The clearance of these shafts permits simple loading of geartrain 200 into box-like case 152', improves stiffness and strength of transfer case 12" and allows for the use of a hollow shaft design, if desired, which reduces the overall weight of transfer case 12". Additionally, continuous sidewall portion 158' of box-like case 152' includes apertures 218, 220, and 222. As is conventional, rotary seals 224, 226, and 228 are press fit into apertures 218, 220, and 222 formed in continuous sidewall portion 158' respectively, to prevent lubricating fluid within chamber 162' from escaping through apertures 218, 220, and 222, respectively.

With continued reference to FIG. 13, planetary gear reduction unit 204 is operably installed between input shaft 202 and rear output shaft 206. Planetary gear reduction unit 204 includes a sun gear 230 mounted to or formed integrally with input shaft 202, a ring gear 232 non-rotatably secured to shelf segment 164', and a carrier assembly 234 having a plurality of pinion gears 236 that are intermeshed with sun gear 230 and ring gear 232. Carrier assembly 234 includes front and rear carrier rings 238 and 240, respectively, that are suitably interconnected and between which each pinion gear 236 is rotatably supported. Specifically, each pinion gear 236 is mounted via a suitable bearing assembly 242 on a pinion shaft 244 extending between carrier rings 238 and 240. As such, rotation of input shaft 202 causes carrier assembly 234 to rotate relative thereto at a reduced speed ratio.

To provide means for selectively coupling rear output shaft 206 to input shaft 202 or planetary gear reduction unit 204, range shift mechanism 208 includes a range sleeve 246 that is mounted via a splined connection 248 for rotation with and axial sliding movement on rear output shaft 206. A unique feature of this invention includes the engagement of drive sprocket 214 by range sleeve 246. This engagement allows range sleeve 246 to move between four distinct positions thus establishing four distinct drive modes.

In the two wheel drive mode, range sleeve 246 is in its furthest forward (left) position (not shown). Front clutch teeth 252 formed on range sleeve 246 mesh with clutch teeth 255 formed on inner surface of sun gear 230 while rear clutch teeth 250 formed on range sleeve 246 disengage from clutch teeth 254 formed on drive sprocket 214. With range sleeve 246 in this position, rear output shaft 206 is rotatably driven by input shaft 202 at a direct speed ratio (i.e., 1:1) relative thereto.

In the four wheel high drive mode, rear clutch teeth 250 mesh with clutch teeth 254 formed on drive sprocket 214 while front clutch teeth 252 dwell or remain in clutch teeth 255 formed on inner surface of sun gear 230. With range sleeve 246 in this position (not shown), rear output shaft 206, along with front output shaft 210, are rotatably driven by input shaft 202 at a direct speed ratio (i.e., 1:1) relative thereto.

In the four wheel neutral drive mode, front clutch teeth 252 disengage from clutch teeth 255 formed on inner surface of sun gear 230 while rear clutch teeth 250 dwell or remain in clutch teeth 254 formed on drive sprocket 214. With range sleeve 246 in this position (not shown), rear output shaft 206 and front output shaft 210 are disengaged from either/or rear carrier ring 240 and sun gear 230. Thus, with range sleeve 246 in this position, rear output shaft 206 and front output shaft 210 are disengaged from all drive input.

In the four wheel low drive mode, as shown in FIG. 13, front clutch teeth 252 mesh with clutch teeth 256 formed on rear carrier ring 240 while rear clutch teeth 250 dwell or remain in clutch teeth 254 formed on drive sprocket 214. With range sleeve 246 in this position, rear output shaft 206 and front output shaft 210 are driven at a reduced speed ratio relative to input shaft 202.

To provide means for selectively moving range sleeve 246 between its above-noted positions, range shift mechanism 208 further includes a shift fork assembly 258 and electric gearmotor 262. Electric gearmotor 262 includes a bell crank 263 and is mounted vertically within box-like case 152'. The location of electric gearmotor 262 within box-like case 152' allows for improved assembly and reduces the occurrence of damage due to corrosion resulting from exposure to the environment. Box-like case 152' also protects electric gearmotor 262 from additional damage resulting from exposure to the environment, such as impact.

With continued reference to FIG. 13 and particular reference to FIG. 14, shift fork assembly 258 includes a link 264, a pivot link 266, a spring fork 268 and a crescent 270. Link 264 is mounted to bell crank 263 at a first end 310. Bell crank 263 causes the first end 310 of link 264 to rotate in an eccentric manner in the direction of arrow A, thereby imparting reciprocating motion on link 264. Pivot link 266 includes upper pins 312 and 314. Link 264 is mounted to pin 312 at a second end 316. Spring fork 268 is retained between pin 314 and second end 316 of link 264, and is pivotally secured to interior chamber 162' of box-like case 152' at pivot point 318. A second end 320 of spring fork 268 is generally U-shaped, includes pin receptors 269 and is free to move and/or flex. Crescent 270 includes pins 271 and is mounted (allowed to rotate on pins 271 which are retained in receptors 269) to second end 320 of spring fork 268. Crescent 270 is similarly generally U-shaped and retained in an annular groove 322 formed in range sleeve 246. Crescent 270 aids in preventing the over bending of spring fork 268.

The rotation of bell crank 263 driven by electric gearmotor 262 causes rotation of pivot link 266 about pivot point 318 via link 264. Spring fork 268 acting as a simple lever moves range sleeve 246 as a slider along rear output shaft 206. Thus, the magnitude of rotation of bell crank 263 in an eccentric manner causes a corresponding direction and amount of axial movement of spring fork 268 for moving range sleeve 246 between its four distinct positions. Suitable switches or push buttons can be activated by the vehicle operator for sending an electric signal to electric gearmotor 262 for causing the desired movement of shift fork assembly 258 and the resulting axial movement of range sleeve 246. In the event the motion of range sleeve 246 along rear output shaft 206 is impeded due to tooth clash or spline lockup, spring fork 268 deflects as a leaf spring as pivot link 266 is actuated. As the impedance is released, the range sleeve 246 moves to the desired location by the force of the spring.

As an alternative to the pillow block assembly shown in FIG. 5, FIG. 15 illustrates a modified arrangement wherein mounting arms are located opposite from one another, bisecting the outer circumference of the pillow block. Depending on the assembly and machining processes used, mounting arms can be located on the bottom, the top, or, as shown, on either side of the pillow block assembly. As seen in FIG. 15, pillow block assembly 274 is substantially circular in shape and includes a pair of mounting arms 276 with a planar underside surface 278 that is adapted to rest upon mounting pads 279 on upper surface 280 of continuous shelf segment 164'. Mounting arms 276 have mounting apertures 282 formed therein which are alignable with apertures 284 in mounting pads 279 on continuous shelf segment 164' for receipt of threaded fasteners 76' therein. Similarly, in this manner, pillow block assembly 274 is rigidly secured to continuous shelf segment 164'. In addition, pillow block assembly 274 includes a key 286 having side portions 288 and a round portion 290 located on a bottom portion 292 thereof. Corresponding keyways (168 shown in FIG. 11) located on the base portion 160' are adapted to receive keys 286 such that pillow block assembly 274 is located in five directions (i.e., up, down, right, left and axial in one direction).

Pillow block assembly 274 further includes an outer cylindrical surface 294, a groove 296 formed in an inner cylindrical surface 298 for receiving bearings 300, and a retaining ring 302 or some similar axial retaining device so as to retain bearings 300 within pillow block assembly 274. Bearings 300 are mounted in pillow block assembly 274 in order to rotatably support end portions of input shaft 202, rear output shaft 206 and front output shaft 210. The use of pillow blocks as described above, allows for more adequate and stiffer support as well as reduces noise transmission. As previously discussed, the use of pillow blocks improves the assembly process by allowing the entire geartrain 200 including shafts, drive components, and pillow blocks to be preassembled and placed into box-like case 152' as one assembly. Employing this technique further allows automated assembly of power transfer device 12" so as to increase productivity and decrease costs.

As can be appreciated from the foregoing, the time and cost required to manufacture new housings for different design variations in power transfer devices can be significantly reduced by the present invention. A common center case 14 can be fabricated for use with an entire family of power transfer devices with different cover plates being the only possible requirement. Additional advantages, such as reduced case resonance and improved testing capability, can be realized employing the above invention. Moreover, the entire geartrain can be visually inspected and tested by "spinning" the drive components while the cover plate(s) are removed. Furthermore, the invention as described above provides improved lubrication in the assembly in that the bearings, seals, and bushings are open to splash lubrication methods with the pillow blocks.

The invention being thus described, it will be obvious that the same may be varied in many ways. In particular, the various embodiments of the modular housing assembly described herein can be used to support the drive components of any power transmission assembly of the type used in motor vehicles, off-road vehicles, press drives and the like. Such variations are not to be regarded as a departure from the spirit and scope of the invention, and all such modifications as would be obvious to one skilled in the art are intended to be included within the scope of the following claims.

What is claimed is:

1. A transfer case for use in a motor vehicle having a power source, and front and rear drivelines comprising:
    a modular housing assembly having a shelf member adapted for supporting the transfer case;
    an input shaft adapted to be driven by the power source;
    a rear output shaft adapted to drive the rear driveline;
    a front output shaft adapted to drive the front driveline;
    a gear reduction unit driven by said input shaft at a reduced speed ratio relative thereto; and
    a range sleeve coupled for rotation with said rear output shaft and movement thereon between a first position whereat said rear output shaft is coupled for rotation with said input shaft at a direct speed ratio relative thereto and a second position whereat said rear output shaft is coupled to said gear reduction unit for rotation therewith at said reduced speed ratio.

2. The transfer case of claim 1 wherein said modular housing assembly comprises:
    a case having a base and a continuous sidewall defining an open interior area and an edge, said shelf member extending from said sidewall into said open interior area; and
    a cover plate attachable to said edge to enclose and seal said open interior area.

3. The transfer case of claim 2 wherein said cover plate is attached to said edge via a plurality of clamps.

4. The transfer case of claim 3 further comprising a motor mounted to said case.

5. The transfer case of claim 4 further comprising a shift fork assembly, said shift fork assembly including:
    a link having a first end mounted to said motor and a second end;
    a pivot link mounted to said second end of said link;
    a spring fork having a first end pivotally secured to said base of said case and a second end; and
    a crescent rotatably mounted to said second end of said spring fork and retained in an annular groove formed in said range sleeve.

6. The transfer case of claim 5 wherein said shelf member includes mounting pads.

7. The transfer case of claim 5 further comprising mounting devices mounted to said shelf member and supporting components of the transfer case.

8. The transfer case of claim 7 wherein said mounting devices include pillow blocks secured to said shelf member and a bearing assembly mounted to said pillow block, said input shaft, said rear output shaft and said front output shaft being rotatably supported by said bearing assembly.

9. The transfer case of claim 8 wherein said pillow blocks are located in five directions.

10. The transfer case of claim 8 wherein said pillow blocks further include a key operatively adapted to fit a corresponding keyway formed on said base of said case.

11. A transmission for use in a four-wheel drive motor vehicle having an engine, and primary and secondary drivelines, said transmission comprising:
    a modular housing assembly having a shelf member adapted for supporting the transmission;
    an input shaft adapted to be driven by the engine;
    a mainshaft;
    a first output shaft adapted to drive the primary driveline;
    a second output shaft adapted to drive the secondary driveline; and
    a constant mesh gearset which can be selectively engaged to couple said mainshaft to said input shaft for driven rotation at predetermined speed ratios, said gearset including a first gear mounted on said input shaft and a second gear mounted on said mainshaft, said first and second gears of said gearset being in constant mesh which one another.

12. The transmission of claim 11 wherein said modular housing assembly comprises:
    a case having a base and a continuous sidewall defining an open interior area and an edge, said shelf member extending from said sidewall into said open interior area; and
    a cover plate attachable to said edge to enclose and seal said open interior area.

13. The transmission of claim 12 wherein said cover plate is attached to said edge via a plurality of spring clamps.

14. The transmission of claim 12 wherein said shelf member includes mounting pads.

15. The transmission of claim 12 wherein said shelf member is a continuous shelf member.

16. The transmission of claim 15 further comprising a motor mounted to said continuous shelf member.

17. The transmission of claim 16 further comprising a shift fork assembly, said shift fork assembly including:
    a link having a first end mounted to said motor and a second end;
    a pivot link mounted to said second end of said link;
    a spring fork having a first end pivotally secured to said base of said case and a second end; and
    a crescent rotatably mounted to said second end of said spring fork and retained in an annular groove formed in a range sleeve coupled for rotation with said first output shaft.

18. The transmission of claim 17 further comprising mounting devices mounted to said continuous shelf member and supporting components of the transmission.

19. The transmission of claim 18 wherein said mounting devices include pillow blocks secured to said continuous shelf member and a bearing assembly mounted to said pillow block, said input shaft, said first output shaft and said second output shaft being rotatably supported by said bearing assembly.

20. The transmission of claim 19 wherein said pillow blocks are located in five directions.

21. The transmission of claim 20 wherein said pillow blocks further include a key operatively adapted to fit a corresponding keyway formed on said base of said case.

* * * * *